(12) United States Patent
Fosbinder et al.

(10) Patent No.: US 7,642,486 B2
(45) Date of Patent: Jan. 5, 2010

(54) WELDING DEVICE WITH ARC TERMINATION CONTROL

(75) Inventors: Daniel C. Fosbinder, Appleton, WI (US); Adam P. Laabs, Brillion, WI (US)

(73) Assignee: Illinois Tool Works Inc., Glenview, IL (US)

( * ) Notice: Subject to any disclaimer, the term of this patent is extended or adjusted under 35 U.S.C. 154(b) by 448 days.

(21) Appl. No.: 11/381,860

(22) Filed: May 5, 2006

(65) Prior Publication Data

US 2007/0257015 A1 Nov. 8, 2007

(51) Int. Cl.
B23K 9/10 (2006.01)
B23K 9/12 (2006.01)
(52) U.S. Cl. ............................ 219/130.5; 219/130.01
(58) Field of Classification Search ............ 219/130.01, 219/132
See application file for complete search history.

(56) References Cited

U.S. PATENT DOCUMENTS 2,769,894 A * 11/1956 Rives .......................... 219/132
4,103,141 A * 7/1978 Wristen .................. 219/130.01
6,548,784 B2 * 4/2003 Sammons et al. ........... 219/132
6,930,280 B2 * 8/2005 Zauner et al. ............... 219/132
2003/0085210 A1 5/2003 Hutchison et al.

FOREIGN PATENT DOCUMENTS

| FR | 2184256 A | 12/1973 |
| GB | 2334228 A | 8/1999 |
| WO | 0232610 A2 | 4/2002 |
| WO | 0232610 A3 | 4/2002 |

* cited by examiner

*Primary Examiner*—Sang Y Paik
(74) *Attorney, Agent, or Firm*—Fletcher Yoder

(57) ABSTRACT

A welding-type apparatus and method providing controlled termination of a welding-type process includes monitoring an arc parameter and setting a threshold based on the monitored arc parameter. When the arc parameter achieves the threshold, weld power is gradually reduced until arc termination. The system provides for a controlled arc termination process which is dynamically defined by the characteristics of each welding arc.

25 Claims, 4 Drawing Sheets

WELDING DEVICE WITH ARC TERMINATION CONTROL

BACKGROUND OF THE INVENTION

The present invention relates generally to welding systems and, more particularly, to a welding arc termination procedure and control.

During a welding process, a weld power is generated by a power source and is communicated to a weld site via a torch. A shielding gas is also communicated to the weld site and shields a weld pool from environmental contaminants. The environmental contaminants include air and its constituents such as water vapor and oxygen. Exposure of the molten weld material to the contaminants detrimentally affects weld quality. The interaction between the contaminants and the material of the weld is, in part, temperature dependent. Accordingly, it is desirable to maintain the flow of the shielding gas after an arc termination until the weld has cooled such that the material of the weld is non-reactive with the environmental contaminants.

Frequently, when an operator desires to terminate a welding process, the operator releases the torch trigger which nearly instantaneously terminates the weld arc and the flow of shielding gas. Although such arc termination expeditiously terminates the weld process, such termination results in an unsatisfactory weld discontinuity at the point of weld termination. During welding arc termination, a gradual reduction in weld power in conjunction with continued flow of shielding gas improves the quality of the weld at the weld termination.

Welding devices with arc termination control which provide for the gradual reduction of weld power and the continued flow of shielding gas generally require operator actuation of a switch to initiate the arc termination sequence. Commonly, the torch includes a switch that is separate from the torch trigger which, when activated, causes the power source to provide the gradual reduction of weld power and continued shielding gas flow. Alternatively, a foot pedal can be provided which actuates the arc termination procedure. Although such devices provide improved arc termination control, they are not without drawbacks.

The extraneous switching means require operator actuation and are ill equipped to tolerate a dynamic welding environment. When an operator is focused on a welding process, the operator occasionally loses the relative position of the torch positioned or foot pedal switching means. Wearing the protective apparel associated with the welding process, the operator can have difficulty locating the pedal when arc termination is desired and thereby terminates the weld process without actuation of the weld termination procedure. Additionally, operator manipulation of the components associated with the welding process inhibits the operator's degree of freedom of motion. Particularly during gas tungsten arc welding (GTAW), wherein the operator is commonly required to position the torch relative to the workpiece with one hand and feed the consumable material with the other hand, the operator is ill-equipped to manually actuate a switch to actuate the weld termination procedure.

Other welding-type devices have automated the means for initiating the weld termination procedure but suffer from alternate drawbacks than those mentioned above. One such system has a feedback feature which monitors a parameter of the weld process and actuates the weld termination procedure responsive to the feedback signal. Prior to initiation of a welding process, an operator must preset a plurality of arc threshold values. During the welding process, when one of the thresholds is crossed a first time, a termination sequence is enabled, and when the threshold is crossed a second time, or a second threshold is crossed, the termination procedure is then actuated. Although such a termination procedure reduces the number of operator steps needed to actuate the arc termination procedure during welding, this weld termination procedure still does not minimize the steps for most efficient operation.

The arc parameters associated with the weld process are affected by the amount of power required for a desired weld process, a length and size of weld cable between the power source and the torch, condition of the weld cable, size and type of the consumable material, desired arc length, and operator skill. Understandably, these are but a few of the variables which affect the value of the monitored arc parameter. The operator must account for each of these parameters when setting the plurality of arc threshold values which initiate and actuate the arc termination procedure. This becomes particularly problematic with novice or minimally experienced operators who may be unaware of the effect of any of the variables on the monitored parameter. That is, an operator unfamiliar with a particular welding system or the requirements of a desired welding process can inadvertently set the threshold values at a value that cannot be achieved during the welding process. Such a configuration results in inoperability of the weld termination procedure. Conversely, if the operator sets the thresholds within a range of normal weld arc performance, the weld termination procedure is initiated and activated prematurely.

In addition to the operating issues addressed above, even when the operator appreciates the interrelation of the all of the variables associated with the threshold, presetting the thresholds is a time consuming and tedious process. In a dynamic work environment, an operator is required to transition from one welding process to another. The variable parameters between the welding processes are not always the same. As such, the operator is required to reset the thresholds for different welding process or forgo utilization of the weld termination procedure. If the operator elects to reset the thresholds, process efficiency decreases as the welding apparatus is idle until the thresholds are reset and weld quality is sacrificed if the operator elects to circumvent the weld termination procedure.

It would therefore be desirable to have a system and method capable of automatically actuating a weld termination procedure and which is dynamically responsive to different weld processes.

BRIEF DESCRIPTION OF THE INVENTION

The present invention provides a system and method of terminating a weld process which overcomes the aforementioned drawbacks. The system provides controlled termination of a welding-type process which includes monitoring an arc parameter and setting a threshold based on the monitored arc parameter. When the arc parameter achieves the threshold, weld power is gradually reduced until arc termination. The system provides for a controlled arc termination process which is dynamically defined by the characteristics of a welding arc.

Therefore, in accordance with one aspect of the present invention, a welding-type device controller is disclosed. The controller has an input, an output, and a processor. The input is configured to receive a feedback signal from an arc process and the output is connected to a power source of the welding-type device. The processor is programmed to perform an arc termination procedure in which an arc termination value is set based on the feedback signal and controls the power source to execute the arc termination procedure when the feedback signal reaches the arc termination value.

According to another aspect of the present invention, a welding apparatus having a power source constructed to generate a weld power is disclosed. The welding apparatus includes a torch connected to the power source and constructed to generate an arc from the weld power. A controller is connected to the power source and configured to monitor an arc voltage. The controller is configured to set a maximum arc voltage that is offset from an initial monitored voltage and control a reduction in weld current to terminate a weld process when the monitored arc voltage equals the maximum arc voltage.

According to a further aspect of the present invention, a method of terminating a weld arc is disclosed. The method includes the steps of detecting an arc parameter during a weld arc duration, setting a threshold based on the detected arc parameter, monitoring a weld parameter which varies by a position of a weld torch relative to a workpiece, and executing a weld termination procedure when the monitored weld parameter achieves the threshold.

Various other features and advantages of the present invention will be made apparent from the following detailed description and the drawings.

BRIEF DESCRIPTION OF THE DRAWINGS

The drawings illustrate one preferred embodiment presently contemplated for carrying out the invention.

In the drawings.

DETAILED DESCRIPTION OF THE PREFERRED EMBODIMENT

Figure 1:
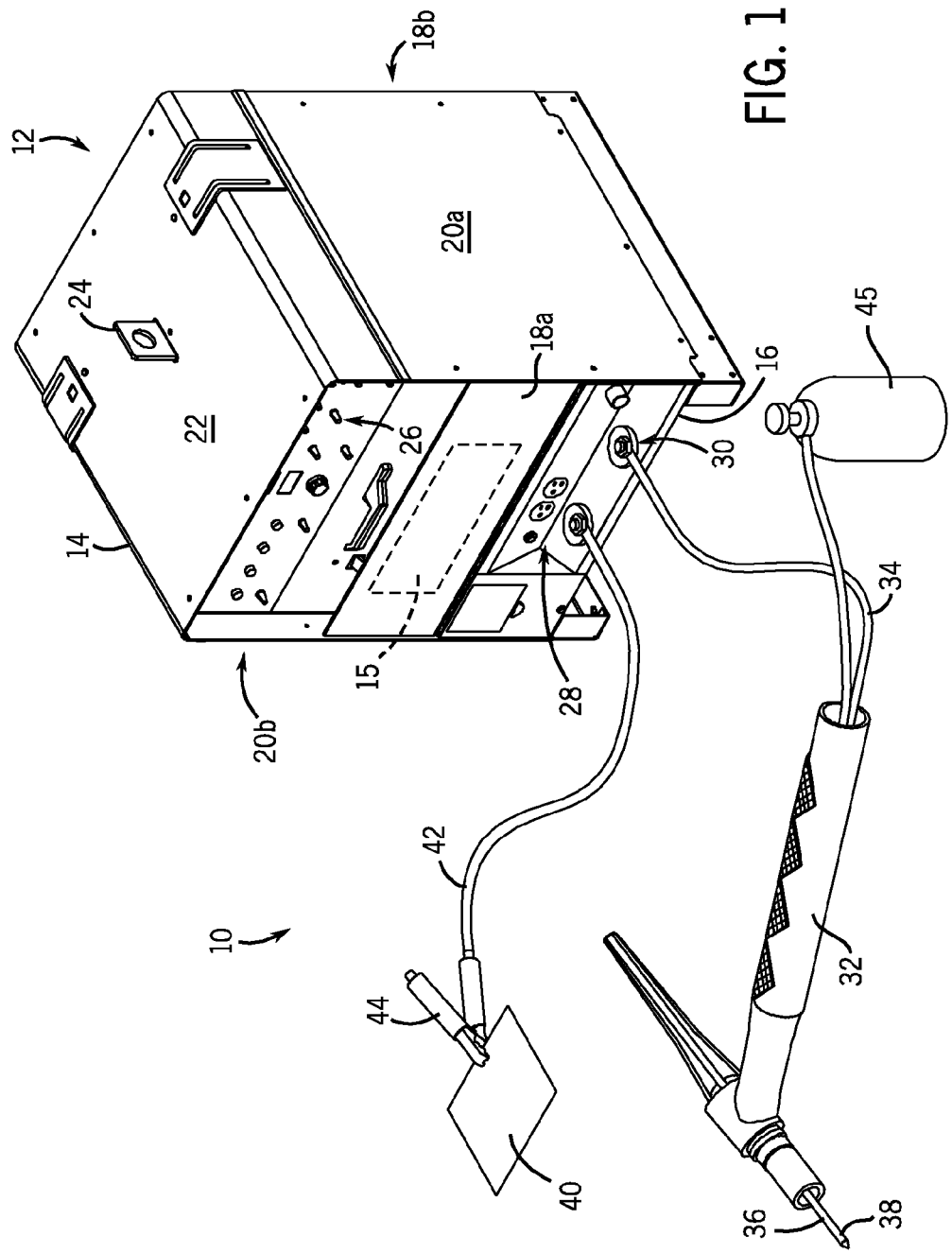
FIG. 1 is a perspective view of a welding-type apparatus according to the present invention.

FIG. 1 is a perspective view of a welding-type system 10 according to the present invention. As described below, welding-type system 10 is configured to perform gas tungsten arc welding (GTAW), commonly referred to as tungsten inert gas, or TIG welding. It is understood and appreciated that the present invention is applicable to other welding processes such as gas metal arc welding (GMAW), metal inert gas welding, commonly referred to as MIG welding, shielded metal arc welding (SMAW), commonly referred to as stick welding, and other welding process. The GTAW configuration of welding-type system 10 is merely exemplary. It is appreciated that torches, gases, and power signals other than those discussed below will benefit from the present invention when tailored to those processes. The exemplary TIG system in no way limits the present invention to TIG welding processes.

Welding-type system 10 includes a power source 12 disposed within an enclosure 14 which is controlled by a controller 15. Enclosure 14 is defined by a base 16, front and back panels 18a, 18b, and a pair of side panels 20a, 20b attached to the base 12. A top cover 22 having a handle 24 is secured to the pair of side panels 20a, 20b to form enclosure 14. The front panel includes control knobs 26 and outlets and receptacles 28 to facilitate connection of welding accessories to the enclosure. For example, an electrode weld output terminal 30 connects a welding-type component, such as a torch 32, to the power source via weld power cable 34. Torch 32 includes a tungsten electrode 36 configured to support a weld arc about an end 38 thereof. A weld cable 42 extends between power source 12 and a clamp 44. Clamp 44 is constructed to engage workpiece 40 and electrically connects workpiece 40 to power source 12. To complete a welding circuit, end 38 of electrode 36 is positioned proximate workpiece 40 and weld power is communicated via an arc between electrode 36 and workpiece 40. A gas cylinder 45 is connected to torch 32 and communicates a shielding gas to torch 32 during a welding process. Understandably, shielding gas could also be communicated to torch 32 via passage through power source 12.

It is appreciated that electrode 38 is not consumed during a welding process. Some welding applications require the introduction of a filler material, or a consumable material, to a weld arc. The consumable material is frequently introduced to a weld pool or the arc produced between torch 32 and workpiece 40 manually by an operator. Alternatively, the filler material could be introduced to the weld pool via an automated means such as a wire feeder. Such consumable wire feeders are commonly associated with GMAW, or MIG welding processes. Regardless if the welding process is performed with the introduction of a filler material or simply by melting a portion of workpiece, it is preferred to isolate the molten portion of the weld from atmosphere as much as possible until the material of the weld cools to a point of being non-reactive with atmospheric pollutants. Furthermore, at weld termination, the weld power must be reduced in a controlled manner to ensure generally uniform weld quality.

Figure 2:
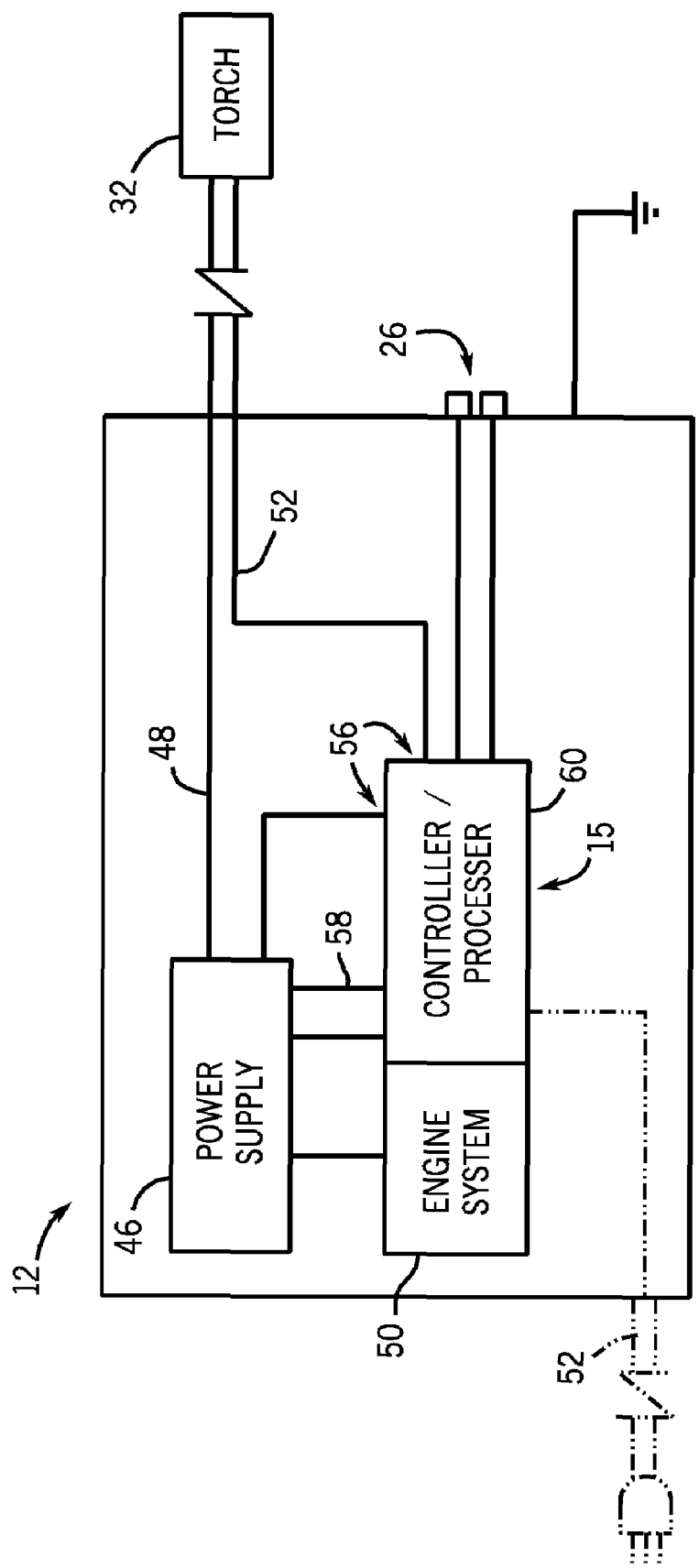
FIG. 2 is a graphical representation of the major components of the welding-type apparatus shown in FIG. 1.

FIG. 2 shows a schematic representation of the major components of welding system 10 which effectuate welding process according to the present invention. Power source 12 of welding-type system 10 includes a power supply 46 constructed to generate a desired weld power. Power supply 46 is connected 48 to torch 32 to communicate the desired weld power thereto. Controller 15 is connected to power supply 46 and configured to instruct the power supply to generate the desired weld power as determined by operator inputs 26. Power source 12 can include an engine driven power generator 50 to deliver the input power to power supply 46 from which the welding-type power is generated. Additionally, or alternatively, power source 12 can also include a power cord 52 which is constructed to connect power supply 46 to a utility power grid from which the welding-type is generated. That is, power source 12 may include only an engine driven generator as input power, only a utility power input as input power, or include both to enhance the functionality of the welding-type device.

Controller 15 includes an input 56 configured to monitor the arc weld parameters and an output 58 connected to power supply 46. During a welding-type process, an operator instructs power source 12 to provide a desired weld power via operator inputs 26. Controller 15 instructs power supply 46 to provide the desired weld power and monitors an arc power parameter via input 56. The weld arc parameters are communicated to controller 15 via input 56. The controller may have a processor 60. Responsive to the feedback signals of the input 56, the controller 15 and/or the processor 60 instructs power source 12 to perform an arc termination procedure via output 58.

Figure 3:
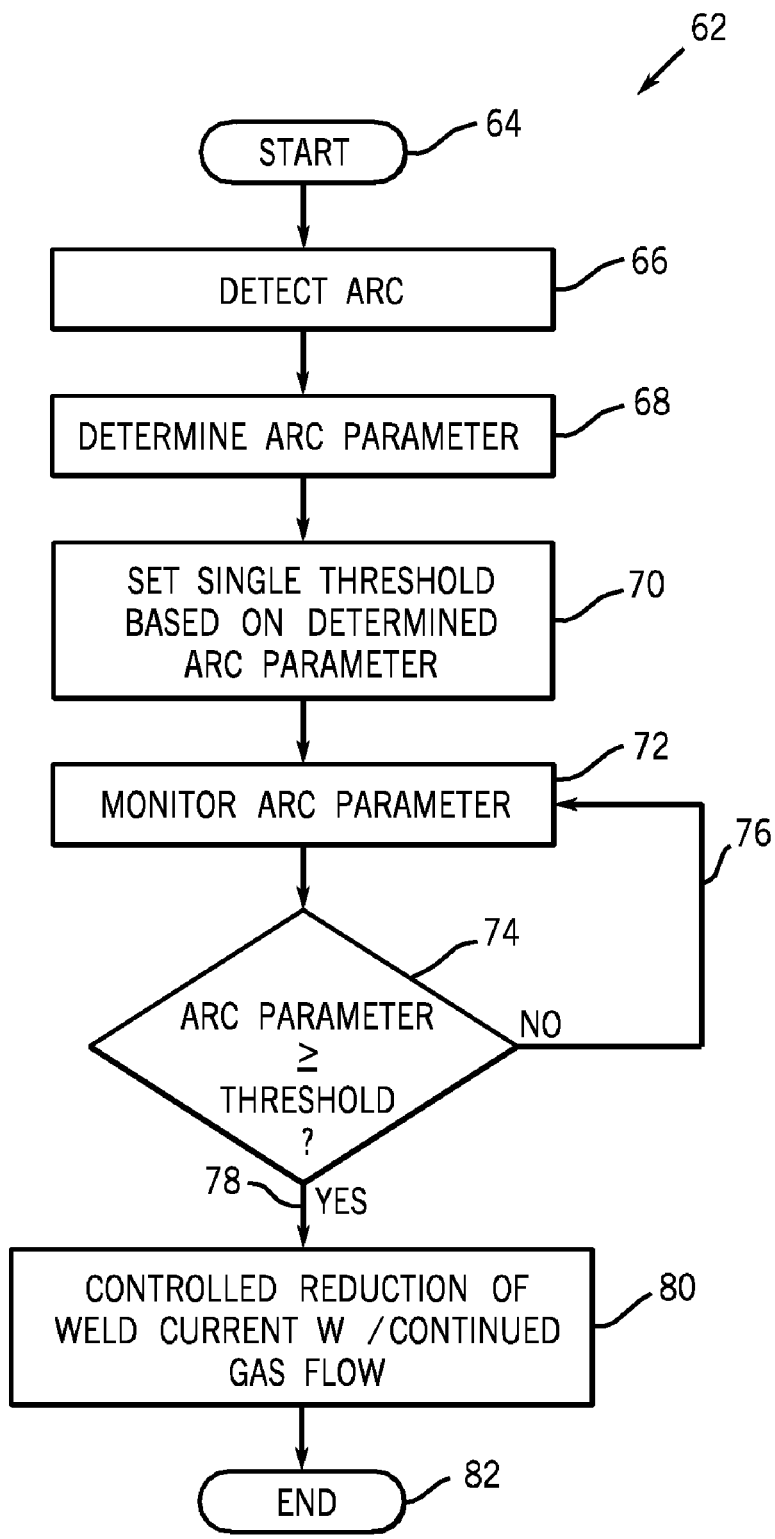
FIG. 3 is a flow chart of an arc termination process performed by the welding-type apparatus shown in FIG. 1.

FIG. 3 shows the arc termination process 62 which executes the arc termination procedure according to the present invention. Arc termination process 62 is initiated 64 when an operator turns the welding-type device ON. When an operator desires to perform a welding operation, process 62 monitors for establishment of a weld arc 66. Process 62 then determines an arc parameter 68 directly from the parameters associated with the welding arc. Preferably, arc parameter 68 is an arc voltage and is further described with respect to FIG. 4. Understandably, other arc parameters such as arc power or arc current could be utilized as arc parameter 68. Once the arc parameter has been determined, process 62 sets a single threshold 70 which is based on determined arc parameter 68. Having established the single threshold 70 of a weld arc, process 62 continues to monitor the arc parameter 72 associated with single threshold 70.

Having set single threshold 70 and continuing to monitor arc parameter 72, process 62 compares the monitored arc parameter to the threshold 74. If the monitored arc parameter is below the single threshold 74, 76, process 62 allows the power source to continue to deliver the desired weld power to the weld process thereby allowing uninterrupted continuation of the weld arc. When the monitored arc parameter meets or exceeds the single threshold 74, 78, process 62 instructs the power source to provide a controlled reduction of the weld current with continued gas flow 80 until the weld arc is extinguished and the single arc weld process is terminated 82. Process 62 is responsive to the arc parameters of each arc and defines the single threshold according to the arc parameters of each arc. As such, arc termination process 62 provides dynamic and automatic control of the reduction of the arc current to maintain weld quality through arc termination.

Figure 4:
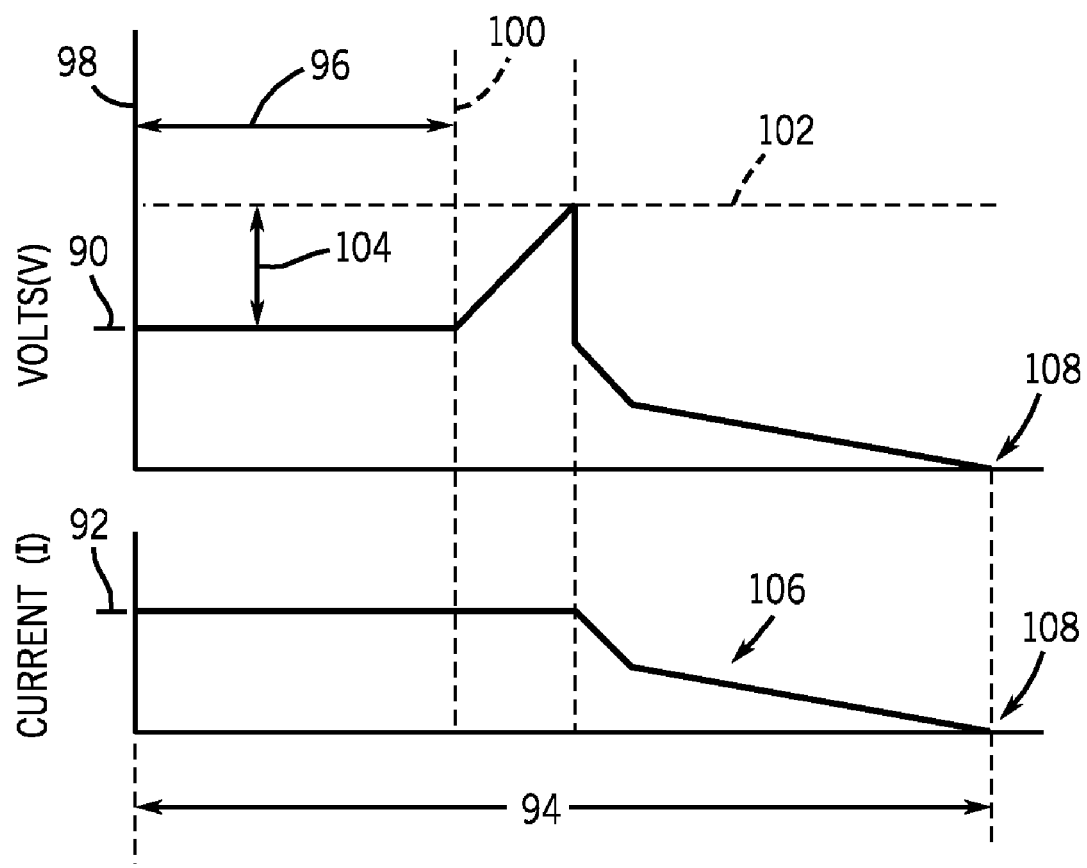
FIG. 4 is a graphical representation of the welding arc power signal during the arc termination process represented in FIG. 3.

FIG. 4 is a plot of an exemplary arc voltage signal 90 and arc current signal 92 that results during each arc interval 94 controlled according to arc termination process 62. Arc termination process 62 is active upon powering up the welder and is therefore active during each arc initiation. During time 96, process 62 monitors voltage 90 associated with the weld arc. Process 62 determines arc parameter 68, as shown in FIG. 3, during time 96. Determined arc parameter 68 is an average arc voltage acquired during interval 96 between arc initialization and a steady state arc condition 100. Alternatively, determined arc parameter 68 could be determined from a single detected arc voltage during interval 96 or determined from a preset arc duration interval 96. Preferably, process 62 averages the arc voltage 98 to determine a steady state arc voltage. This averaging can be done as a snapshot of the voltage during time 96, or can be done on a running average. Therefore, averaging can take place once at arc steady state 100, during the duration 96, or a selected portion of duration 96.

After the average steady state arc voltage has been determined, a single threshold 102 is established. Threshold 102 is an arc voltage value that deviates some minimum value from the determined arc voltage. Preferably, threshold 102 is offset from the determined arc voltage a value 104 sufficient to prevent nuisance execution of the weld termination procedure 80 shown in FIG. 3. Each time an arc is established, the determined arc parameter associated with the arc is utilized to set single threshold value 102. The power source is configured to provide the desired weld power to maintain the steady state weld condition 100 until the determined parameter meets or exceeds threshold 102.

When welding voltage 90 reaches threshold 102 by way of an operator moving the torch away from the workpiece, process 62 begins the controlled reduction of weld current with continued gas flow 80 as described with reference to FIG. 3. As shown in FIG. 4, a controlled reduction of weld current 106 reduces the welding arc current until arc termination 108. The termination of the arc current 92 can be accomplished utilizing a number of different techniques (not represented) and continues for a desired duration. That is, the arc termination process can vary any of: the duration required for arc termination, the rate of arc collapse for any given arc sequence, and/or the shape of the voltage or current curve associated with the weld arc for a given weld process. The arc termination process provides a welding arc termination control wherein the termination of the arc can be custom tailored to the given welding process. Furthermore, through monitoring of the arc parameter and setting a single threshold based on the monitored arc parameter, arc termination process 62 is responsive distinctive arc characteristics specific to each arc.

Some specific examples of the different techniques that can be implemented can include providing a variable threshold for trigger sensitivity, and/or providing a percentage current drop based on the initial welding current, for example. That is, and as an example, if the original welding current was 300 amps, a 10 percent reduction would sufficiently provide the same user feedback as a 40 percent drop when the initial welding current is at 30 amps. Under either scenario, the end user will readily recognize that the arc termination procedure has begun. Similarly, a variable decay time can be provided, also based on the preset current. For example, at an initial 300 amp welding current, a 7 second decay time may be desirable, whereas at a 30 amp initial welding current, decay time may be as little as 1 second. Further, a variable final average current could be provided that reduces the final average current through a minimum current value, also based on the preset initial welding current. At the exemplarily 300 amp initial welding current, a final value may be in the range of 35 amps to as much as 125 amps, whereas at the initial welding value of 30 amps, the final average may be in the area of 8 amps. Such variability takes into account the size of material being welded at those current initial levels and provides a very clean finish. Additionally, the final time for that final average may also be variable, and that variability may also be based on the preset initial welding current. These are some, but not all, of the possible variables that can be implemented into the system. One skilled in the art will readily recognize that other variables may be incorporated in such a robust system and also, those skilled in the art will readily recognize that the aforementioned parameters are for exemplarily purposes only.

As one skilled in the art will fully appreciate, the heretofore description of welding devices not only includes welders, but also includes any system that requires high power outputs, such as heating and cutting systems. Therefore, the present invention is equivalently applicable with any device requiring high power output, including welders, plasma cutters, induction heaters, aircraft ground power units, and the like. Reference to welding power, welding-type power, or welders generally, includes welding, cutting, heating power, or ground power for aircraft. Description of a welding apparatus illustrates just one embodiment in which the present invention may be implemented. The present invention is equivalently applicable with many high power systems, such as cutting and induction heating systems, aircraft ground power systems or any similar systems.

Therefore, one embodiment of the present invention includes a welding-type device controller having an input, an output, and a processor. The input is configured to receive a feedback signal from an arc process and the output is connected to a power source of the welding-type device. The processor is programmed to perform an arc termination procedure in which an arc termination value is set based on the feedback signal and controls the power source to execute the arc termination procedure when the feedback signal reaches the arc termination value.

Another embodiment of the present invention includes a welding apparatus having a power source constructed to generate a weld power. The welding apparatus includes a torch connected to the power source and constructed to generate an arc from the weld power. A controller is connected to the power source and configured to monitor an arc voltage. The controller is configured to set a maximum arc voltage that is offset from an initial monitored voltage and control a reduction in weld current to terminate a weld process when the monitored arc voltage equals the maximum arc voltage.

A further embodiment of the present invention is a method of terminating a weld arc which includes the steps of detecting an arc parameter during a weld arc duration, setting a threshold based on the detected arc parameter, monitoring a weld parameter which varies by a position of a weld torch relative to a workpiece, and executing a weld termination procedure when the monitored weld parameter achieves the threshold.

The present invention has been described in terms of the preferred embodiment, and it is recognized that equivalents, alternatives, and modifications, aside from those expressly stated, are possible and within the scope of the appending claims.

What is claimed is:

1. A welding-type device controller comprising:
   an input configured to receive a feedback signal from an arc process;
   an output connected to a power source of the welding-type device; and
   a processor programmed to perform an arc termination procedure in which an arc termination value is set based on the feedback signal and controls the power source to execute the arc termination procedure when the feedback signal reaches the arc termination value.

2. The controller of claim 1 wherein the feedback signal is an arc voltage and wherein the arc termination procedure is initiated by movement of a torch away from a workpiece which causes the feedback signal to reach the arc termination value.

3. The controller of claim 1 wherein the processor is configured to determine an average arc voltage over an interval between an arc initialization and a minimum arc duration and set the arc termination value to a value above the average arc voltage.

4. The controller of claim 1 wherein the processor is configured to set the arc termination value from the feedback signal acquired after an arc has been maintained for a selected time.

5. The controller of claim 1 wherein the feedback signal indicates an arc length controlled by a distance between a torch and a workpiece.

6. The controller of claim 1 wherein the arc termination procedure controls the power source to reduce a weld current in a controlled manner until arc termination.

7. The controller of claim 1 wherein the processor is configured to monitor for the feedback when the power source is turned on.

8. The controller of claim 1 wherein the processor sets a single arc termination value for each arc process.

9. A welding apparatus comprising:
   a power source constructed to generate a weld power;
   a torch connected to the power source and constructed to generate an arc from the weld power; and
   a controller connected to the power source and configured to monitor an arc voltage, the controller configured to set a maximum arc voltage that is offset from and based on an initial monitored voltage and control a reduction in weld current to terminate a weld process when the monitored arc voltage equals the maximum arc voltage.

10. The welding apparatus of claim 9 wherein the initial monitored voltage is one of an arc voltage at a selected time after an arc is established and an average arc voltage and wherein the controller sets a single threshold value and when the arc voltage exceeds the single threshold value, the weld current is reduced to arc termination.

11. The welding apparatus of claim 10 wherein a specified movement of the torch away from a workpiece causes arc voltage to exceed the single threshold.

12. The welding apparatus of claim 10 wherein the average arc voltage is calculated by the controller from a plurality of arc voltages acquired during a selected duration.

13. The welding apparatus of claim 12 wherein the selected duration is one of a preset time interval after an arc inception and a variable time interval between an arc inception and a steady state arc condition.

14. The welding apparatus of claim 9 further comprising a gas system connected to the power source and configured to communicate a gas flow to the torch, the gas flow controlled by the controller to maintain a relatively constant gas flow during reduction of the weld current and after the termination of the weld arc.

15. The welding apparatus of claim 9 further comprising an adjustable input connected to the controller and configured to communicate one of a desired arc voltage and a desired arc current to the controller.

16. The welding apparatus of claim 15 wherein the maximum arc voltage is offset from the desired arc voltage an amount that is achieved without arc collapse by movement of the torch away from a workpiece.

17. The welding apparatus of claim 9 wherein the weld process is a gas tungsten arc welding process.

18. A method of terminating a weld arc comprising the steps of:
   detecting an arc parameter during a weld arc duration;
   setting a threshold based on the detected arc parameter;
   monitoring a weld parameter which varies by a position of a weld torch relative to a workpiece; and
   executing a weld termination procedure when the monitored weld parameter achieves the threshold.

19. The method of claim 18 wherein the weld termination procedure further comprises gradually reducing a weld current until arc termination.

20. The method of claim 19 wherein the weld termination procedure further comprises maintaining a generally uniform shielding gas flow until at least to arc termination.

21. The method of claim 18 further comprising determining an average arc voltage from a plurality of arc voltages detected during an interval between establishment of a weld arc and the weld arc achieving steady state.

22. The method of claim 21 further comprising setting the threshold based on the average arc voltage.

23. The method of claim 22 wherein the threshold is arc voltage and the threshold arc voltage is offset above the average arc voltage.

24. The method of claim 18 wherein the step of detecting the arc parameter further comprises detecting an arc voltage a predetermined time after a weld arc has been established.

25. The method of claim 18 further comprising setting a single threshold for each weld arc duration of a plurality of weld arc durations.

* * * * *

UNITED STATES PATENT AND TRADEMARK OFFICE
CERTIFICATE OF CORRECTION

PATENT NO. : 7,642,486 B2 Page 1 of 1
APPLICATION NO. : 11/381860
DATED : January 5, 2010
INVENTOR(S) : Fosbinder et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 693 days.

Signed and Sealed this

Sixteenth Day of November, 2010

David J. Kappos
*Director of the United States Patent and Trademark Office*